A. Pierce.
Harrow.

No 57,961.    Patented Sep. 11. 1866.

Witnesses:
Frank Alden
E. E. Waite

Inventor:
Almeren Pierce

UNITED STATES PATENT OFFICE.

ALMERON PIERCE, OF OLMSTED, OHIO.

IMPROVEMENT IN COMBINED HARROW AND MARKER.

Specification forming part of Letters Patent No. 57,961, dated September 11, 1866.

*To all whom it may concern:*

Be it known that I, ALMERON PIERCE, of Olmsted, in the county of Cuyahoga and State of Ohio, have invented certain new and useful Improvements in Harrows, &c.; and I do hereby declare that the following is a full and complete description of the same, reference being had to the accompanying drawings, making a part of this specification, in which—

Figure 1:
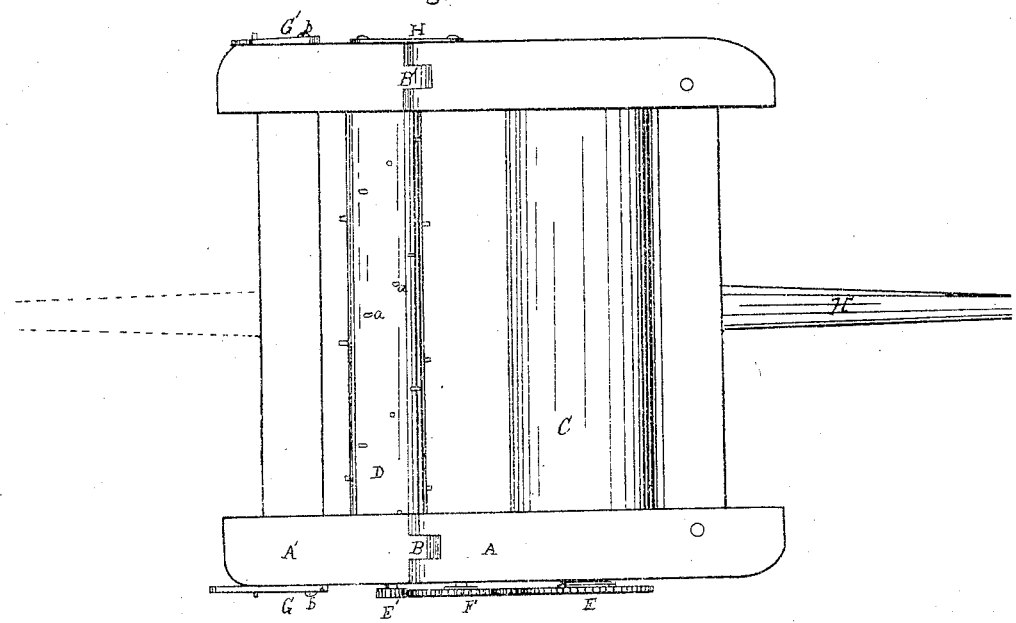
Figure 2:
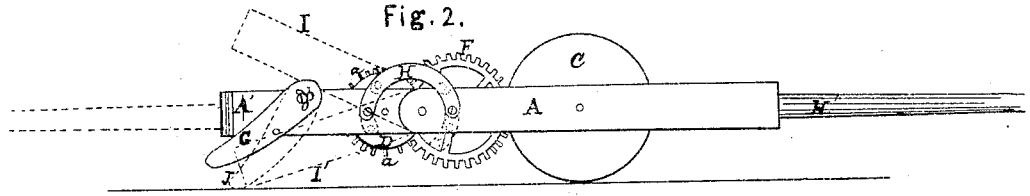

Figure 1 is a top view of the harrow. Fig. 2 is a side view.

Letters of reference refer to like parts in the different views presented.

A strong frame-work of wood, consisting of two sections, A A', Fig. 1, constitutes the frame of the harrow. These two sections are connected by a hinge-joint, B B', A being the front and A' the rear section. In the front section is a smooth roller, C, which may be made of wood or any other suitable material, and of any desired size. D is also a wooden roller, the face of which is studded with teeth or pins $a$ $a$, &c., and are arranged in a double coil around the roller. E is a geared wheel, secured to the end of the shaft of the roller C, on the outside of the frame, and through which the shaft passes for that purpose. E' is a spur-wheel or pinion upon the shaft of the roller D, and connected to the wheel E by the intermediate wheel F.

It will be observed that by this arrangement of the wheels the toothed roller and plain roller move in the same direction.

G G' are a pair of arms connected to the side of the rear end of section A' by the screws $b$ $b'$, which permit the arms being raised upward or downward, for the purpose hereinafter set forth.

H, Figs. 1 and 2, is a curved arm, one end of which is fastened to section A, while the other end reaches over to the front section, and connected to it by a pin passed through the arm, holes being provided for that purpose.

H' is a tongue or pole by which the machine is drawn, and may be used either way—the smooth roller followed by the toothed one, or vice versa—by shifting the tongue from the front to the rear.

The construction of this machine is such that it may be used singly as a smooth simple roller, by raising up the rear section by means of the joints B, as above described, in the direction indicated by the dotted lines I, Fig. 2, and securing it there by the curved arm H, at any desired height; or it can be used as a revolving harrow by dropping the rear end upon the ground, as indicated by the dotted lines I', the arms G being so connected to the frame that they can be lifted up out of the way when used for the purpose of harrowing.

The purpose of the arms G is for marking for corn, and when in use they are dropped to the position indicated by the dotted lines J, Fig. 2. When the machine is used for this purpose the frame is kept straight by the curved arm H. The toothed roller is also prevented from turning by slipping the intermediate wheel out of gear, so that the smooth or front roller only turns, which serves to steady and to keep in a straight line the machine while working, or the two rollers may be used together, if thought desirable.

What I claim as my improvement, and desire to secure by Letters Patent, is—

1. The toothed roller D and smooth roller C, in combination with the frames A A', as and for the purpose substantially set forth.

2. The wheels E E' and F, the arms G, and curved arm H, as arranged, and in combination with the rollers D and C, and the frame A and A', for the purpose and in the manner described.

ALMERON PIERCE.

Witnesses:
W. H. BURRIDGE,
E. E. WAITE.